Dec. 18, 1934.  F. N. SPELLER  1,984,771
METHOD OF TREATING TUBULAR PRODUCTS
Filed April 1, 1931  2 Sheets-Sheet 1
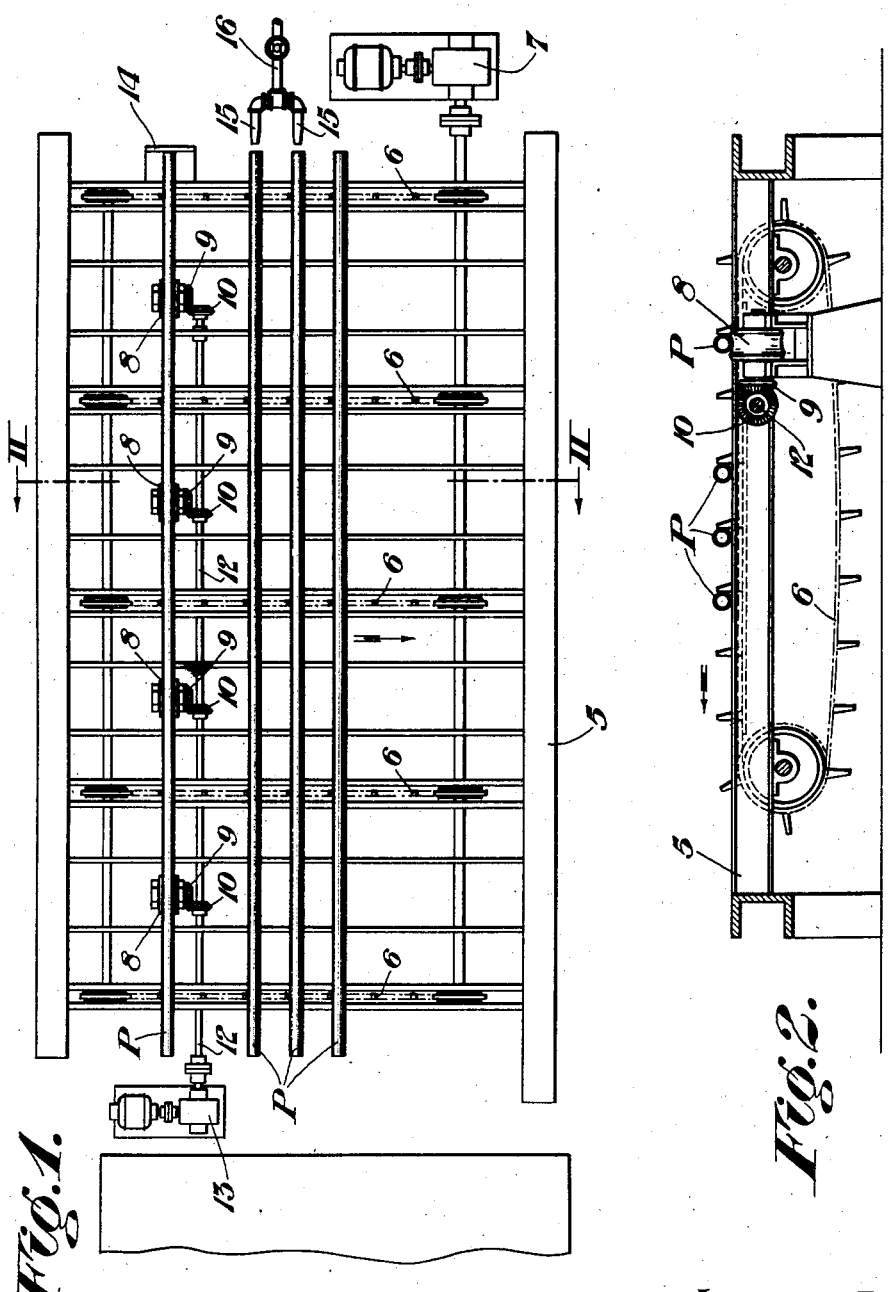
Inventor:
FRANK N. SPELLER,
by: Usina & Rauber
his Attorneys.

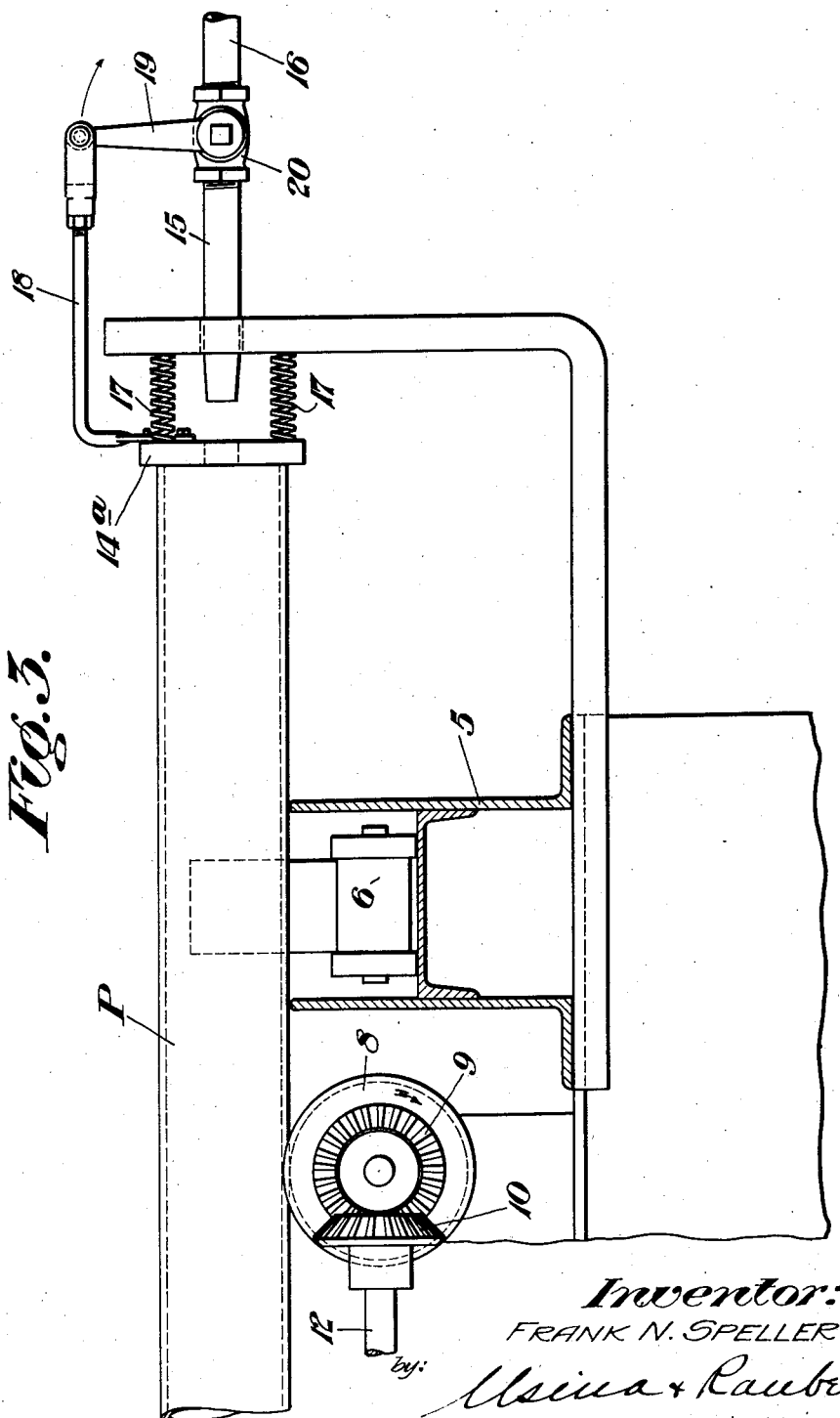

Patented Dec. 18, 1934

1,984,771

UNITED STATES PATENT OFFICE 1,984,771

METHOD OF TREATING TUBULAR PRODUCTS

Frank N. Speller, Pittsburgh, Pa., assignor to National Tube Company, a corporation of New Jersey Application April 1, 1931, Serial No. 526,967

2 Claims. (Cl. 29—81)

In the manufacture of tubular products such as pipe, and particularly butt-weld pipe, it is the practice in certain scale removing processes to first cool the welded pipe inside and outside to a point at which the cinder on the surfaces of the pipe sets and becomes brittle, which is approximately to a temperature of 1700 degrees Fahrenheit. The pipe is then passed through the reducing rolls and is thereby reduced in diameter and elongated slightly, this action breaking up and loosening what remains of the welding scale.

As the outside of the pipe is directly exposed to the atmosphere while on the cooling table it naturally cools faster than the inside of the pipe. Cooling by exposure to the atmosphere can easily be regulated to reduce the outside surface of the pipe to the desired temperature; but the inner surface of the pipe not being exposed to the air, cooling thereof is retarded so that when the outside surface reaches the proper de-scaling temperature the inside surface temperature is above this point.

In some mills the pipe is passed through a bath of water at the rolls, a certain amount of water entering the interior of the pipe and cooling the inside surface of the latter. While this method in a way serves to bring the smaller sizes of pipe to the proper de-scaling temperature, in the case of larger sizes the pipe, on entering the bath, either does not take up enough water or takes up too much so that irregular cooling results. Another difficulty is that the front end portions, or the end of the pipe first entering the bath, is cooled more rapidly than the rear end portions.

This irregular cooling of the outside and inside surfaces of the pipe is an objectionable feature. In endeavoring to bring the interior of the pipe to the proper de-scaling temperature the outside surface is overcooled, thereby reducing it below the proper de-scaling temperature and hardening the said surface, particularly when subjected to the action of water, resulting in excessive wear on the swaging rolls.

It is the purpose of the present invention to provide a method and means whereby cooling of the inside surface of the pipe is accelerated; cooling of the inner and outer surfaces of the pipe is made substantially uniform; and the pipe may be reduced to the proper de-scaling temperature without overcooling or hardening the outside surface.

The method consists generally in injecting into the end of each length of pipe, preferably while on the cooling table, a predetermined amount of cooling fluid such as water which forms into steam, expanding and blowing out at one or both ends of the pipe and chilling the inside surface to the desired de-scaling temperature without overcooling or subjecting the outside surface of the pipe to contact with water and hardening said surface. The outside surface is at the same time brought to the desired de-scaling temperature by exposure to the air.

Suitable apparatus whereby the method may be carried out is shown in the accompanying drawings, wherein:

Figure 1 is a plan of a cooling table and one type of cooperating apparatus for practicing the present method.

Figure 2 is a sectional view taken on the line II—II of Figure 1.

Figure 3 is an enlarged view in sectional elevation of a modification in structure.

The reference numeral 5 generally designates a conventional type of cooling or transfer table, 6 the conveyer chain and 7 the driving mechanism for the conveyer.

In this form of apparatus for practicing the method, the pipe, indicated at P, is carried across the table 5 by the conveyer chain 6 until it reaches a set of slightly grooved conveyer rolls 8 which are rotatably mounted in the path of the pipe, as shown, and are driven by means of bevel gears 9 and 10, the gear 9 being secured on the roller-shafts and the gears 10 on a driveshaft 12 which extends back to one end of the table and is driven by suitable mechanism, as at 13.

When the pipe rides onto the rolls 8 the latter urge it at right angles toward one end of the table against an alinement device or stop 14 which serves to aline the pipe lengths. The pipe lengths are then moved across the table by the conveyer chain past one or more nozzles 15 which are supplied with water under pressure through a valved supply pipe 16. At this point a predetermined amount of water is injected into the pipe, forming steam which rapidly expands and blows out at the ends of the pipe, chilling the inside surface to the desired de-scaling temperature and loosening the scale. A plurality of nozzles are shown in the present instance so that if the pipe should fail to receive a stream of water from one nozzle it will receive it from another.

The stream of water from the nozzles 15 in this form of the apparatus may be continuous, the supply being shut off in the valved supply line 16 when it is desired to discontinue operations.

The pipe lengths cool exteriorly by exposure to the air while passing over the cooling table 5 and the present process cools them interiorly at the same time to about the same extent and to the desired de-scaling temperature.

From the table 5 the pipe is passed to a scale removing machine or rolls, as will be understood.

In Figure 3 the apparatus operates automatically, the pipe lengths being moved by the rolls 8 against a cap or stop 14ᵃ which is formed with a hole to receive the tapered end of the nozzle 15 and is resiliently mounted by means of springs 17. The stop 14ᵃ has a rod 18 connected at one end thereto and at its opposite end said rod is pivotally connected to a control lever 19 for a valve 20 which is mounted in the supply line for the nozzle 15.

When the pipe is urged against the stop 14ᵃ the latter is depressed against the end of the nozzle 15, the valve opened and a stream of water under pressure passes into the pipe.

By this means no water is allowed to reach the exterior end surfaces of the pipe lengths; also, the water is conserved. In this instance, the one end of the pipe through which the water enters is temporarily closed while the steam is generated and then blows out of the other or opposite end at a high velocity.

Other artificial cooling fluids than water may be passed through the pipe such, for example, as air, the amount or rate of passage through the pipe being calculated to advance the rate of cooling of the interior compared with its exterior rate of cooling.

I claim:

1. The method of conditioning pipe prior to descaling which consists in moving said pipe along a cooling table in a direction transverse of its longitudinal axis and at such speed that its outer surface is reduced by radiation to a temperature of approximately 1700 degrees Fahrenheit, and during the passage of said pipe along said cooling table supplying its interior with a liquid coolant in order to cool its interior to substantially the same temperature as the exterior thereof so as to facilitate the descaling of the interior in a subsequent operation.

2. The method of conditioning pipe prior to descaling which consists in moving said pipe along a cooling table in a direction transverse of its longitudinal axis and at such speed that its outer surface is reduced by radiation to a temperature of approximately 1700 degrees Fahrenheit, and causing said pipe to operate mechanism to spray its interior with liquid coolant in order to cool its interior to substantially the same temperature as the exterior thereof so as to facilitate the descaling of the interior in a subsequent operation.

FRANK N. SPELLER.